A. FISHER.
BOX FOR CONTAINING FACE POWDER OR THE LIKE.
APPLICATION FILED APR. 30, 1920.
1,383,394. Patented July 5, 1921.
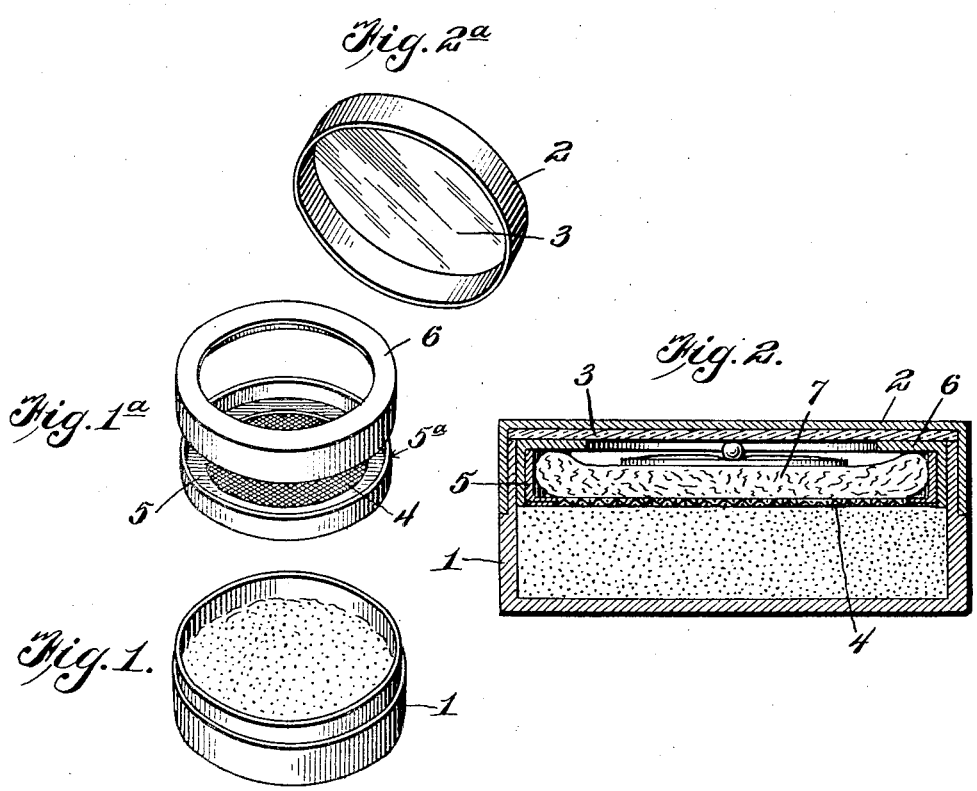
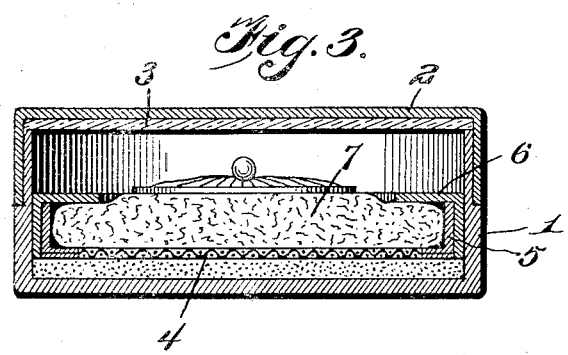
Inventor
Ada Fisher,
By B. Singer,
Attorney

UNITED STATES PATENT OFFICE.

ADA FISHER, OF LONDON, ENGLAND.

BOX FOR CONTAINING FACE-POWDER OR THE LIKE.

1,383,394.  Specification of Letters Patent.  Patented July 5, 1921.

Application filed April 30, 1920. Serial No. 378,009.

*To all whom it may concern:*

Be it known that I, ADA FISHER, a subject of the King of Great Britain, and resident of London, England, have invented certain new and useful Improvements in Boxes for Containing Face-Powder or the like, of which the following is a specification.

This invention relates to boxes for containing face powder or the like and has reference to that kind of box which is provided with a sieve adapted to rest on the surface of the contents and descend as the contents are gradually used up.

One form of such box which has been suggested was provided with a sieve having tabs to permit of its ready removal, the ends of the tabs passing under the frame of the sieve. A difficulty experienced with this type of box is due to the fact that the sieve carrying frame necessarily fits the box loosely, thus permitting the powder to escape between the wall of the box and the sieve carrying frame. It will be appreciated that this is very undesirable seeing that the object of the sieve is to prevent the puff picking up too much powder as occurs when a puff is merely dipped into the powder.

The object of the present invention is to obviate this defect and the invention consists of a particular construction of box, the primary feature of which is that the sieve carying frame is attached to a puff retaining rim or frame, the whole being a comparatively tight fit in the box, the sieve carrying frame and the puff retaining frame descending together as one structure as the contents of the box are used up. An advantage of this construction is that the space between the sieve and the puff retaining frame always remains the same and the puff itself, therefore, always bears firmly on the sieve and itself prevents leakage through the sieve due to vibration and other causes.

In the accompanying drawings I have illustrated one form of a box constructed in accordance with my invention Figure 1 being a perspective view of the usual box, Fig. 1ª is a view of the sieve carrying frame and the puff retaining frame separated one from the other.

Fig. 2ª is a perspective view of the lid of the box,

Fig. 2 is a sectional view of the box as a whole and Fig. 3 is a similar view showing the position of the sieve after some of the contents of the box has been used up.

Referring to these drawings the numeral 1 designates the box proper and 2 is the closing lid which may if desirable be provided with a mirror 3 on its inside. The sieve 4 in the example illustrated is carried by a frame 5 and this frame is in turn connected to the puff retaining rim or frame 6 which is of such a diameter as to make a tight sliding fit within the box 1. The space 7 serves to form a container for the powder puff. The members 5 and 6 are connected together, for example, by gluing along the edge 5ª of the member 5 before the two members 5 and 6 are brought together.

The foregoing construction is given by way of example and merely illustrates a convenient method of making a cardboard box. It should be understood however that other constructions may be adopted so long as the essential condition is observed that the sieve and the puff retaining rim or frame form one inseparable structure which so fits the box or container, that while it can descend as a whole as the powder is used up the powder cannot freely leak back to the top of the sieve.

If desirable the box may be made square or of any desired shape and as a means of further preventing tilting grooves in the periphery of the sieve carrying frame may register with ribs on the inner periphery of the box or vice-versa.

What I claim and desire to secure by Letters Patent is:—

A toilet powder receptacle comprising a box proper and a puff receptacle adapted to normally rest upon the upper surface of the powder contents of the box, said puff receptacle comprising a sieve having a peripheral frame of a diameter less than the inside diameter of the said box, a puff retaining rim or frame permanently secured to said sieve frame, so as to constitute a receptacle having a perforated base which receptacle is a tight sliding fit within the said box, substantially as specified.

In witness whereof I affix my signature.

(MRS.) ADA FISHER.